(12) United States Patent
Clissold et al.

(10) Patent No.: US 10,956,389 B2
(45) Date of Patent: *Mar. 23, 2021

(54) FILE TRANSFER SYSTEM USING FILE BACKUP TIMES

(71) Applicant: International Business Machines Corporation, Armonk, NY (US)

(72) Inventors: David N. Clissold, Austin, TX (US); Itzhack Goldberg, Hadera (IL); Su Liu, Austin, TX (US); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/389,269

(22) Filed: Apr. 19, 2019

(65) Prior Publication Data

US 2019/0243810 A1 Aug. 8, 2019

Related U.S. Application Data

(63) Continuation of application No. 14/641,566, filed on Mar. 9, 2015, now Pat. No. 10,303,666.

(51) Int. Cl.
*G06F 16/21* (2019.01)
*G06F 11/14* (2006.01)
*G06F 16/178* (2019.01)

(52) U.S. Cl.
CPC ........ *G06F 16/219* (2019.01); *G06F 11/1451* (2013.01); *G06F 11/1458* (2013.01); *G06F 11/1464* (2013.01); *G06F 16/178* (2019.01); *G06F 2201/83* (2013.01)

(58) Field of Classification Search
CPC combination set(s) only.
See application file for complete search history.

(56) References Cited

U.S. PATENT DOCUMENTS 5,446,888 A 8/1995 Pyne
8,150,805 B1 4/2012 Tawri
(Continued)

FOREIGN PATENT DOCUMENTS

WO 02103546 W 12/2002
WO 2007149100 A4 1/2009
WO 2011002741 A1 1/2011

OTHER PUBLICATIONS

"Pyinotify: monitor filesystem events with Python under Linux."; Printed Jan. 15, 2015; pp. 1-11; <http://pyinotify.sourceforge.net/>.

(Continued)

*Primary Examiner* — Van H Oberly
(74) *Attorney, Agent, or Firm* — Daniel R. Simek

(57) ABSTRACT

Embodiments of the present invention provide a system and method for synchronizing data to update backup files. In one embodiment, data associated with files to be synchronized is sent to a second computer system by a first computers system. The second computer system matches data associated with the files to be synchronized to a database, and the first computer system determines differences between an old and new version of the files to be synchronized and creates a backup of the files. The backup of the files is stored in a storage device.

20 Claims, 3 Drawing Sheets

(56) References Cited

U.S. PATENT DOCUMENTS

| | | | | |
|---|---|---|---|---|
| 8,825,606 | B1* | 9/2014 | Zhang | G06F 11/2094 707/679 |
| 2004/0267836 | A1 | 12/2004 | Armangau | |
| 2005/0071379 | A1 | 3/2005 | Kekre | |
| 2007/0226438 | A1* | 9/2007 | Erofeev | G06F 11/1471 711/162 |
| 2008/0228833 | A1 | 9/2008 | Kano | |
| 2009/0106388 | A1* | 4/2009 | Iwami | G06F 11/1448 709/217 |
| 2011/0276684 | A1* | 11/2011 | Singh | G06F 9/4856 709/224 |
| 2013/0054522 | A1* | 2/2013 | Gao | G06F 16/27 707/620 |
| 2013/0066838 | A1* | 3/2013 | Singla | G06F 11/1469 707/679 |
| 2014/0149530 | A1 | 5/2014 | Dietz | |
| 2015/0199243 | A1 | 7/2015 | Wu | |

OTHER PUBLICATIONS

"Can rsync scan tiles only with mtime since T?"; Samba, Aug. 23, 2007; Printed Jan. 15, 2015; pp. 1-7; <http://samba.2283325.n4.nabble.com/can-rsync-scan-files-only-with-mtime-since-T-td2505154.html>.

"Understanding Unix/Linux Timestamp's"; Tolis Group Knowledge Base, Apr. 29, 2010; Printed Jan. 15, 2015; pp. 1-2; <http://knowledgebase.tolisgroup.com/?View=entry&EntryID=236>.

Appendix P: List of IBM Patents or Patent Applications Treated as Related.

U.S. Appl. No. 14/641,566; Entitled "File Transfer System Using File Backup Times"; filed Mar. 9, 2015; pp. 1-26.

U.S. Appl. No. 14/724,896; Entitled "File Transfer System Using File Backup Times"; filed May 29, 2015; pp. 1-26.

Buchmüller, Daniel, "Ubidas—a Novel P2P Backup System"; Diploma Thesis; University of Zurich, Department of Informatics; Mar. 31, 2008; pp. 1-92.

Paiva, João, "BackupChunk: Chunk-Based Backup System"; Instituto Superior Técnico, Universidade Técnica de Lisboa; Nov. 2009; pp. 1-91.

Tridgell et al., "The rsync algorithm"; Australian National University, Department of Computer Science, Canberra, Act 0200, Australia; Nov. 9, 1998; Printed Jan. 15, 2015; p. 1; <https://rsync.samba.org/tech_report/>.

Tridgell, Andrew, "Efficient Algorithms for Sorting and Synchronization"; A thesis submitted for the degree of Doctor of Philosophy at the Australian National University, Feb. 1999; pp. 1-115.

* cited by examiner

FILE TRANSFER SYSTEM USING FILE BACKUP TIMES

BACKGROUND OF THE INVENTION

The present invention relates generally to the field of data backup systems, and more particularly to synchronizing data to update backup files.

As computer usage becomes increasingly prominent, file backup is an essential task to secure important personal and/or business data. The files on a computer are fragile and can be destroyed or damaged by a software malfunction, viruses, worms, Trojans, and the biggest cause of lost files, the operator. The risk of file loss has led computer users to store files at locations other than the local computer, such as on backup disks or online backup. Therefore, if a computer crashes or is infected with a virus that results in a loss of files, these files will still be accessible at that other location. The lost files can then be restored to the local computer using the backup source.

One known program used for file backup is RSync. RSync is a remote file/data synchronization protocol that allows the user to synchronize files between two computers. In other words, it ensures that both copies of the file are the same. RSync is capable of synchronizing files without sending the whole file across the network. If there are any differences, RSync detects these differences and sends across the differences, so the client or server can update their copy of the file to make the copies the same. However, while RSync is an efficient backup utility for a small to moderate number of files, it has some difficulties in meeting backup windows when dealing with a large number of files, i.e., hundreds of millions of files.

SUMMARY

According to one embodiment of the present invention, a method is provided, the method comprising: receiving, by a first computer system, an indication to begin a file synchronization; sending, by the first computer system, to a second computer system, data associated with one or more source files to be synchronized; matching, by the second computer system, the data associated with the one or more files to be synchronized with a first version of the files to be synchronized contained in a database of the second computer system; determining, by the first computer system, differences between the first version of the files to be synchronized with a second version of the files to be synchronized; creating a backup of said second version of the files to be synchronized by merging, by one or more computer processors, said differences with said first version of the files to be synchronized; storing in one or more storage devices, by one or more computer processors, said backup of said second version of the files to be synchronized; and confirming, by one or more computer processors, that said backup of said second version of the files to be synchronized has been stored in said one or more storage devices.

DETAILED DESCRIPTION

Existing file transfer applications identify and isolate the differences between two files, i.e., local and remote, and transmit only those differences to the receiving computer. While RSync is an efficient backup utility for a small to moderate number of files, it has some difficulties in meeting backup windows when dealing with a large number of files, i.e., hundreds of millions of files. Embodiments of the present invention provide systems and methods for backing up data to optimize the synchronization of data. By storing data within the inode to use the access time field, the most recent backup time can be tracked and compared to the most recent modification time.

Figure 1:
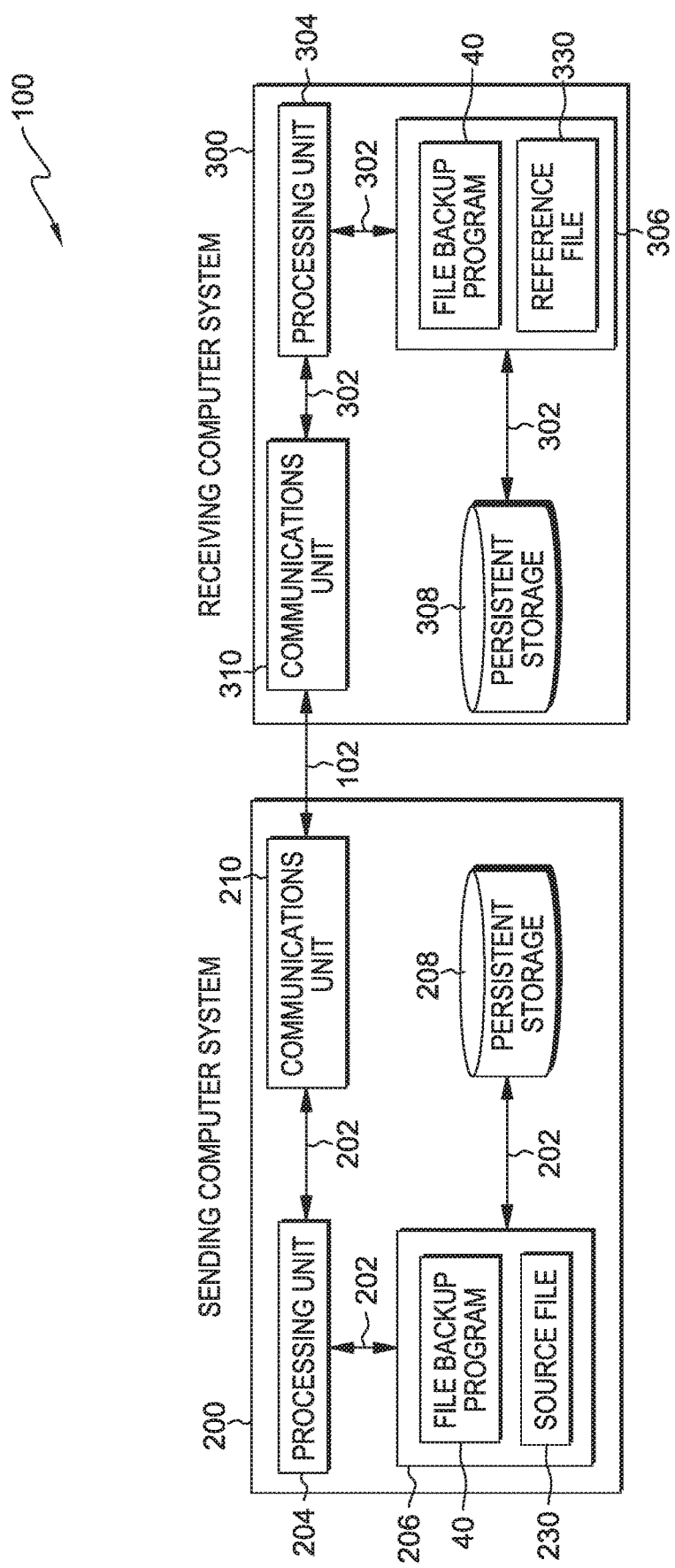
FIG. 1 is a functional block diagram illustrating a communications network, in accordance with an embodiment of the present invention.

The present invention will now be described in detail with reference to the figures. FIG. 1 is a functional block diagram illustrating a communications network, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, communications network 100 includes sending computer system 200 and receiving computer system 300, interconnected via communications cable 102.

Sending computer system 200 and receiving computer system 300 can be desktop computers, laptop computers, specialized computer servers, or any other computer systems known in the art. In certain embodiments, sending computer system 200 and receiving computer system 300 represent computer systems utilizing clustered computers and components to act as a single pool of seamless resources when accessed through a network. For example, such embodiments may be used in data center, cloud computing, storage area network (SAN), and network attached storage (NAS) applications. In certain embodiments, sending computer system 200 and receiving computer system 300 are representative of any electronic devices, or combination of electronic devices, capable of executing machine-readable program instructions, as described in greater detail with regard to FIG. 3.

Sending computer system 200 comprises processing unit 204, memory 206, persistent storage 208, and communications unit 210, which are interconnected via communications fabric 202. Communications fabric 202 is a data bus connecting all the internal components of sending computer system 200 and can be wire, optical fiber, or any other suitable communications connection method.

Communications unit 210 is an application-specific or process-specific software construct servicing as a communications endpoint in a computer's host operating system. The function of communications unit 210 is to uniquely identify different applications or processes running on a single computer and thereby enable them to share a single physical connection to a packet-switched network, i.e., the Internet or local area networks. Packet switching is a digital networking communications method that groups all transmitted data, regardless of content, type, or structure, into suitably sized blocks called packets.

Memory 206 includes source file 230 and file backup program 40. Memory 206 is the device or devices used to store information for use in a computer system, and comprises random access memory (RAM), read only memory (ROM), and external systems memory (not depicted in FIG. 1).

Processing unit 204 is the electronic circuitry within sending computer system 200 that carries out the instructions of a computer program by performing the basic arithmetic, logical, control, and input/output (I/O) operations specified by the instructions. Processing unit 204 executes file backup program 40, which is a sequence of stored instructions kept in memory 206.

Receiving computer system 300 is similar to sending computer system 200 and includes processing unit 304, memory 306, persistent storage 308, and communications unit 310, which are interconnected via communications fabric 302. File backup program 40 and reference file 330 are stored in memory 306. Although, for ease of description, one computer system is designated sending computer system 200 and the other is designated receiving computer system 300, the computer systems are generally interchangeable.

Sending computer system 200 and receiving computer system 300 are linked through communications cable 102 connected at communications unit 210 and 310, respectively. It should be appreciated, however, that any other suitable connection for transferring data, such as a wireless connection, may be used to link sending computer system 200 and receiving computer system 300. In order to accomplish data transfer, sending computer system 200 and receiving computer system 300 include computer program controls that, for example, are stored in RAM and executed by the processing units of each computer system. In one embodiment of the invention, the sending and receiving computer system controls are combined into a single file backup program 40.

File backup program 40 is resident at each computer system, which allows each computer system to operate as either a sending or receiving computer system. File backup program 40 is a list of instructions to be used by sending computer system 200 and receiving computer system 300 for the purposes of synchronizing files on both computer systems.

In one embodiment of the invention, it is assumed that source file 230 located at sending computer system 200 is to be sent to receiving computer 300. It is also assumed that reference file 330 is located at receiving computer system 300 and includes at least some similarities to source file 230. Source file 230 is the file that is used during normal operation and is modified by the user. Normal operation, as used herein, refers to typical use of a computer by a user for operations such as creating/editing text documents. Reference file 330 is the backup file and is only changed when a new version of source file 230 is synchronized. Synchronize, synchronization, backup, and backing up, as used herein, refer to keeping multiple copies of a set of data, i.e., source file and reference file, coherent with one another. When transferring a source file, a reference file that may have data that is similar to the source file is identified by, for example, having a file name that is the same or similar to the source file. The invention described herein generally assumes that a reference file has been identified. Source file 230 and reference file 330 will be discussed in greater detail below.

Figure 2:
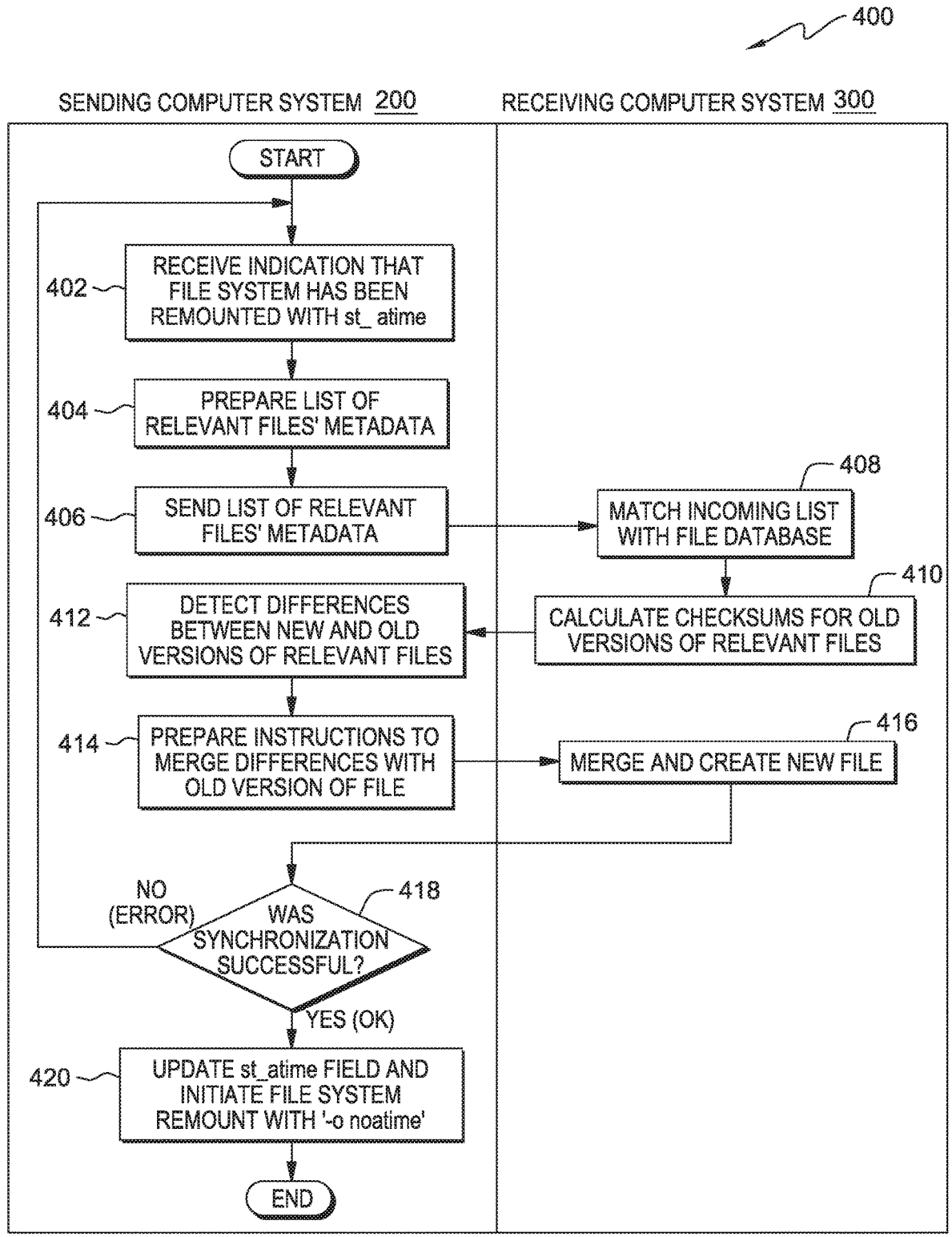
FIG. 2 is a flowchart depicting operational steps of a connected file backup program for synchronizing files, in accordance with an embodiment of the present invention.

FIG. 2 is a flowchart 400 depicting operational steps of file backup program 40 for synchronizing files, in accordance with an embodiment of the present invention. In this exemplary embodiment, file backup program 40 incorporates the remote synchronization protocol, RSync. Specifically, FIG. 2 illustrates, inter alia, the upload process of RSync as it pertains to uploading a new version of the file to receiving computer system 300. It should be appreciated, however, that during a download (the reverse process), the new version of the file exists on receiving computer 300 and the steps are executed by the opposite computer system. For example, during the upload process (as depicted in FIG. 2), steps 402, 404, 406, 412, 414, 418, and 420 are executed by sending computer system 200, however, during the download process, they are executed by receiving computer system 300. Likewise, steps 408, 410, and 416 are executed by receiving computer system 300 during the upload process, whereas, the aforementioned steps are executed by sending computer system 200 during the download process.

A key component of the instant invention involves the file system metadata in the file index node, or inode. There are certain metadata fields that are common to all file systems. The common inode metadata fields include, but are not limited to, mode, link and block counts, owner user ID (UID) and group ID (GID), size, and timestamps including access date, modify date, and create/change date. Specifically, the relevant timestamps are access date and modify date. The file access date, designated as st_atime hereinafter, refers to the file access time and records when a file was last accessed. The st_atime field is updated when a file is opened or when a file is used by other utilities for other operations, i.e., RSync. The file modify date, designated as st_mtime hereinafter, refers to file modification time and is updated when a file is modified. A file is modified, and thus the st_mtime field is updated, when the content of a file is updated or when a file is saved, i.e., during normal operation.

The instant invention suggests reusing the existing st_atime (access time) field as a backup timestamp, which will indicate when the file was last copied to the backup disc. Typically, the st_atime field is updated every time a file or directory is accessed, which takes a heavy toll on computer system performance. As an option to circumvent the st_atime update process, the '-o noatime' option was added. The st_atime can be disabled using the command 'mount -o noatime/dev/sdb2/sdb2', however, any suitable alternative can be used. When a file system is mounted with '-o noatime', the st_atime field of the files and directories is not recorded. Moreover, mounting the source side file system with '-o noatime' leaves an available timestamp field in the disc inode, and the st_atime field can then be used to track the most recent RSync time. Although a new field, i.e., backup time, can be added to the inode structure, all previously existing file system data would not exhibit the benefit of that new field. Reusing the st_atime field provides a solution that can be used by all Portable Operating System Interface (POSIX) compliant file systems. This semantic change allows RSync to determine which files to synchronize without soliciting metadata information from reference file 330 on receiving computer system 300. Having the data within source file 230 inode itself reduces the time needed to scan for file differences and thus expedites the synchronization process. The synchronization process will be discussed in greater detail in the description below.

In step 402, sending computer system 200 receives an indication that the file system has been remounted with st_atime. In this exemplary embodiment, sending computer system 200 is initially mounted with '-o noatime' so that the st_atime field is not updated during normal operation. Prior to executing file backup program 40, i.e., just before the backup/RSync time is invoked, the file system must be remounted to activate the st_atime so that an access to the files' data will be recorded. Moreover, as RSync accesses the files to replicate them on the backup disc, the time of access is recorded, and thus the st_atime reflects the most recent backup time. The st_atime can be activated using the command 'mount -o remount/dev/sdb2', however, any suitable alternative can be used. It should also be appreciated that the instant invention can be designed such that the file system is remounted with st_atime automatically, by file backup program 40, or manually, by the user prior to executing file backup program 40.

In step 404, sending computer system 200 prepares a comprehensive list of all relevant files' metadata. Relevant files, as used herein, refers to any source files that must be synchronized and includes new files and modified files (i.e., when a file's data changes). In this exemplary embodiment, sending computer system 200 consults the st_mtime and the st_atime of each file at the source end. Any file that has been modified more recently than its RSync/backup time (i.e., 'st_atime<st_mtime') is added to the relevant files list. This new function, where st_mtime is compared with the st_atime of each file, is enabled by changing the flist.c file in RSync. For example, an updated version of a document or a new document will have a 'st_atime<st_mtime'. Files that have not been modified since they were last synchronized, i.e., 'st_atime>st_mtime', are skipped and are not added to the relevant files list. It should be appreciated, that the st_atime field is not updated during this stage, as file backup program 40 is not accessing actual files, but rather file metadata, and compiling a list of file names.

In step 406, sending computer system 200 sends the list of relevant files' metadata of the files to be synchronized (i.e., source file 230) to receiving computer system 300. For example, sending computer system 200 determines that an updated version of a Microsoft Word document titled Existing_V2.doc is a relevant file and must be synchronized. Sending computer system 200 adds Existing_V2.doc to the relevant file list and sends the file metadata for Existing_V2.doc to receiving computer system 300. In another example, sending computer system 200 determines that a new document titled New_V1.doc is a relevant file and must be synchronized. Sending computer system 200 adds New_V1.doc to the relevant file list sends the file metadata for New_V1.doc to receiving computer system 300.

In step 408, receiving computer system 300 receives the list of relevant files' metadata of the files to be synchronized from sending computer system 200 and matches incoming file metadata with files from its own database. In this exemplary embodiment, receiving computer system 300 searches for an old version of those files, i.e., reference file 330, by looking for files with matching inode attributes, such as mode, link and block counts, owner user ID (UID) and group ID (GID), size, and timestamps including access date, and create/change date. For example, receiving computer system 300 receives the list of files' metadata, which includes Existing_V2.doc, from sending computer system 200. Receiving computer system 300 searches its own file database to find the old version, Existing_V1.doc. In another example, the relevant files list contains newly created document New_V1.doc. Receiving computer system 300 will search its own file database but will not find any versions as it is a newly created document.

In step 410, receiving computer system 300 calculates checksums for the old versions of the relevant files and sends them to sending computer system 200. In this exemplary embodiment, receiving computer system 300 applies a checksum function (formula) to the relevant files, on a block-by-block basis, to calculate their checksums, or hash values. A checksum or hash value is a small-sized datum from a block of digital data for the purpose of detecting errors which may have been introduced during its transmission or storage. Receiving computer system 300 sends the relevant files' per-block checksums along with their respective metadata to sending computer system 200. It should be appreciated, that for newly created files, receiving computer system 300 will not have an old version of the file, and therefore, an indication of such will be sent to sending computer system 200. For example, for newly created document New_V1.doc, receiving computer system 300 will provide a notification to sending computer system 200 that no such file exists instead of sending a checksum.

In step 412, sending computer system 200 receives the files' checksums and metadata from receiving computer system 300 and detects the differences between the new and old versions of the relevant files. In this exemplary embodiment, sending computer system 200 first verifies the data transmission by applying the same checksum function used in step 410 to the data to retrieve the relevant files' per-block checksums. If the received checksum values match the sent value, i.e., the checksums calculated in step 410 and 412 respectively, the data transmission is considered to be successful and error-free. Sending computer system 200 then detects the differences between the new and old versions of the relevant files. Sending computer system 200 calculates the differences by iterating, on a bit-by-bit basis, each version of each relevant file.

In step 414, sending computer system 200 prepares instructions to merge the differences between the new and old versions of the relevant files together with the old version of the relevant files and sends the merged instructions to receiving computer system 300. In this exemplary embodiment, sending computer system 200 uses the metadata sent by receiving computer system 300 (step 410) along with the relevant files' data differences (step 412) and prepares a script with instructions identifying data differences and file locations to be applied on receiving computer system 300 in order to recreate exact copies of the relevant files as they appear on sending computer system 200.

In step 416, receiving computer system 300 merges the old file with differences detected in the new file and sends an OK/Error status code to sending computer system 200. In this exemplary embodiment, each file's manuscript is used to create a temporary file using the old version of the file and the data differences that sending computer system 200 sent. The temporary file is then renamed to become the permanent file, and its metadata is changed accordingly. These files will now have a 'st_atime>st_mtime', which reflects that the file is synchronized on both computer systems. Receiving computer system 300 sends an OK status code to sending computer system 200 to confirm the successful synchronization of the relevant files. In the event that the relevant files are not properly synchronized, an Error status code is sent to sending computer system 200.

In step 418, sending computer system 200 receives an OK/Error status code from receiving computer system 300 and determines whether the relevant files have been properly synchronized. In this exemplary embodiment, sending computer system 200 must confirm proper synchronization before remounting the file system with '-o noatime' and disabling st_atime.

If, in step 418, sending computer system 200 determines that the synchronization was not successful, then, sending computer system 200 restarts the file synchronization process from step 402. In this exemplary embodiment, the file synchronization is not successful when receiving computer system 300 returns an Error status code.

If, in step 418, sending computer system 200 determines that the synchronization was successful, then, in step 420, sending computer system 200 updates the st_atime field of the relevant files and initiates the file system remount with '-o noatime'. In this exemplary embodiment, sending computer system 200 has received confirmation of successful synchronization (OK status code) and records the time of the backup in the st_atime field of the relevant files. Sending computer system 200 then initiates the file system remount to disable the st_atime field and preserve the backup time. As previously discussed, disabling the st_atime field ensures that no modified file will be considered as already backed up just because it was opened during normal operation.

Accordingly, by performing the operational steps of FIG. 2, data is backed up without having to iterate, on a bit-by-bit basis, every file to find the differences between source file 230 and reference file 330. Only files that have been modified more recently than they have been synchronized will be examined for differences. Thus, this exemplary embodiment can be used to simplify and expedite the backup and synchronization of data from sending computer system 200 to receiving computer system 300.

Figure 3:
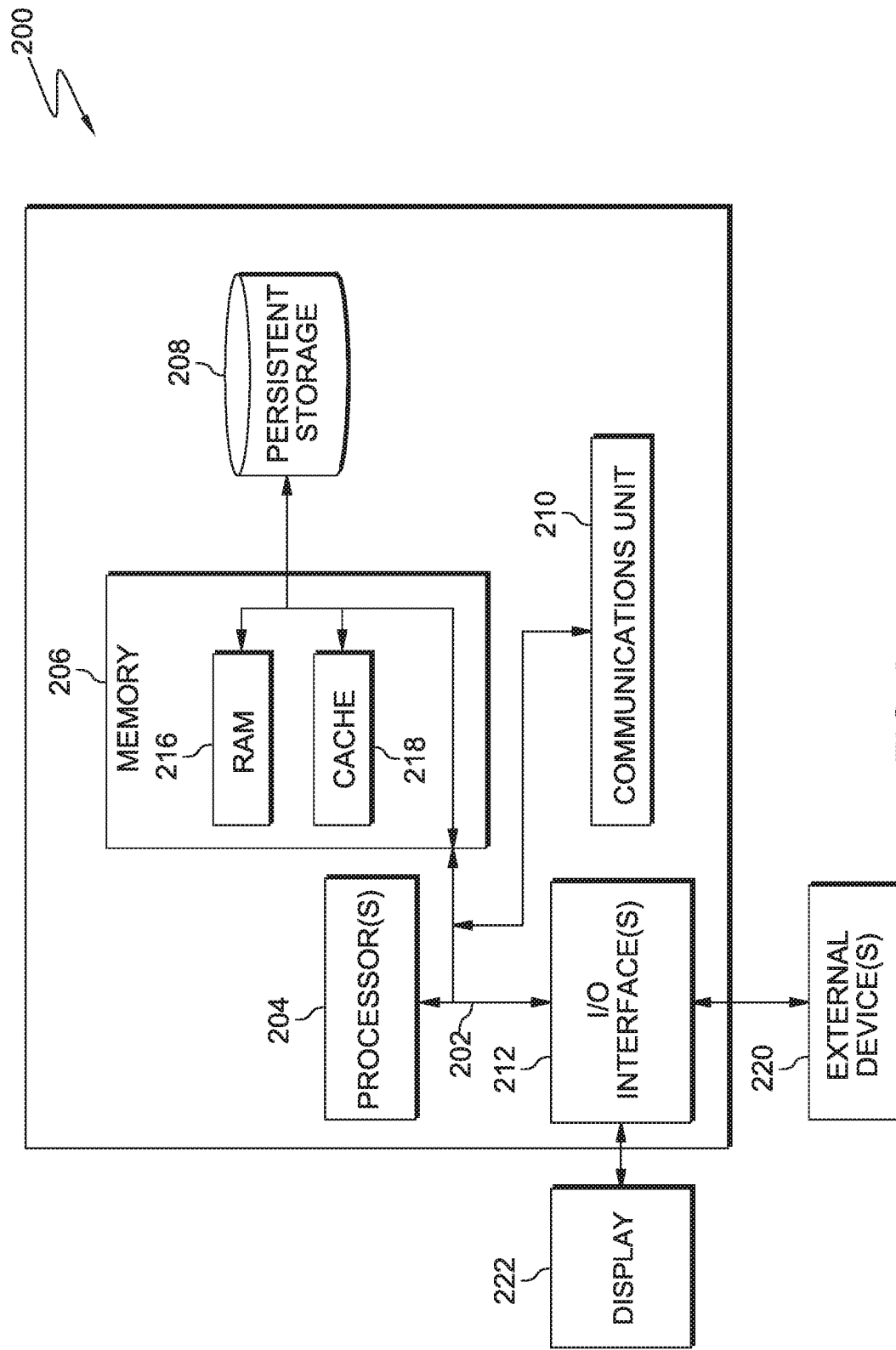
FIG. 3 is a block diagram of internal and external components of a computer system, in accordance with an embodiment of the present invention.

FIG. 3 is a block diagram of internal and external components of sending computer system 200 and receiving computer system 300, which is representative of the computer system of FIG. 1, in accordance with an embodiment of the present invention. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Sending computer system 200 includes communications fabric 202, which provides for communications between one or more processors 204, memory 206, persistent storage 208, communications unit 210, and one or more input/output (I/O) interfaces 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206 and persistent storage 208 are computer-readable storage media. In this embodiment, memory 206 includes random access memory (RAM) 216 and cache memory 218. In general, memory 206 can include any suitable volatile or non-volatile computer readable storage media. Software (i.e., file backup program 40) is stored in persistent storage 208 for execution and/or access by one or more of the respective processors 204 via one or more memories of memory 206.

Persistent storage 208 may include, for example, a plurality of magnetic hard disk drives. Alternatively, or in addition to magnetic hard disk drives, persistent storage 208 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer-readable storage medium that is also part of persistent storage 208.

Communications unit 210 provides for communications with other computer systems or devices via a network. In this exemplary embodiment, communications unit 210 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to sending computer system 200 through communications unit 210 (i.e., via the Internet, a local area network, or other wide area network). From communications unit 210, the software and data can be loaded onto persistent storage 208.

One or more I/O interfaces 212 allow for input and output of data with other devices that may be connected to sending computer system 200. For example, I/O interface 212 can provide a connection to one or more external devices 220 such as a keyboard, computer mouse, touch screen, virtual keyboard, touch pad, pointing device, or other human interface devices. External devices 220 can also include portable computer-readable storage media such as, for example, thumb drives, portable optical or magnetic disks, and memory cards. I/O interface 212 also connects to display 222.

Display 222 provides a mechanism to display data to a user and can be, for example, a computer monitor. Display 222 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
responsive to receiving a confirmation of a first synchronization of a first plurality of files of a first file system corresponding with a second plurality of files of a second file system, wherein individual files of the first plurality of files and the second plurality of files include a first metadata field and a second metadata field, one or more processors modifying a mounting of the first file system to disable recording of data to the first metadata field of the first plurality of files;
responsive to receiving a request of a second synchronization, one or more processors remounting the first file system, and enabling recording of data to the first metadata field of the first plurality of files;

one or more processors identifying files of the first plurality of files to synchronize with corresponding files of the second plurality of files, based on a timestamp recorded in the second metadata field being more recent than a timestamp recorded in the first metadata field of the first plurality of files;

one or more processors sending to the second file system, identification of the files of the first plurality of files to synchronize with the corresponding files of the second plurality of files, and initiating the second synchronization between the identified files of the first plurality of files and the corresponding files of the second plurality of files; and responsive to receiving a confirmation of the second synchronization of the identified first plurality of files with the corresponding file s of the second plurality of files, one or more processors modifying the remounting of the first file system to disable recording data to the first metadata field of the first plurality of files.

2. The method of claim 1, further comprising:

in response to enabling recording of data to the first metadata field of the first plurality of files of the first file system, one or more processors updating the first metadata field of the first plurality of files with a timestamp corresponding to the second synchronization of the files of the first plurality of files with the corresponding files of the second plurality of files, wherein the first metadata field is an access date metadata field.

3. The method of claim 1, further comprising:

in response to a modification of a file of the first plurality of files of the first file system, one or more processors updating the second metadata field of the file with a timestamp corresponding to the modification made and saved, wherein the second metadata field is a modify metadata field.

4. The method of claim 1, wherein the first metadata field and the second metadata field are included in an index node (inode) of a file of the first plurality of files and the second plurality of files.

5. The method of claim 1, wherein the first synchronization and the second synchronization are performed using a modified RSync backup utility using an access metadata field to include a timestamp of a synchronization of a file of the first plurality of files with a corresponding file of the second plurality of files.

6. The method of claim 1, wherein the first metadata field and the second metadata field are selected from the group of metadata fields consisting of: mode, link and block counts, owner user ID (UID), group ID (GID), size, access date, modify date, and create/change date.

7. The method of claim 1, wherein the first metadata field is an access metadata field designated as st_atime and the second metadata field is a modify metadata field designated as st_mtime.

8. The method of claim 1, wherein the first metadata field is disabled during the first file system remount utilizing a mount -o noatime/dev/sdb2/sdb2 option command.

9. The method of claim 1, wherein the first metadata field is re-enabled during the first file system remount utilizing a mount -o remount/dev/sdb2 mount -o noatime/dev/sdb2/sdb2 option command.

10. The method of claim 1, wherein the first file system and the second file system are Portable Operating System Interface (POSIX) compliant file systems.

11. The method of claim 1, wherein the first metadata field is added as a new metadata field to the first plurality of files and the second plurality of files.

12. A computer program product comprising:

a computer readable storage medium and program instructions stored on the computer readable storage medium, the program instructions comprising:

responsive to receiving a confirmation of a first synchronization of a first plurality of files of a first file system corresponding with a second plurality of files of a second file system, wherein individual files of the first plurality of files and the second plurality of files include a first metadata field and a second metadata field, program instructions to modify the mounting of the first file system to disable recording of data to the first metadata field of the first plurality of files;

responsive to receiving a second synchronization request, program instructions to remount the first file system, and enable recording of data to the first metadata field of the first plurality of files;

program instructions to identify files of the first plurality of files to synchronize with corresponding files of the second plurality of files, based on a timestamp recorded in the second metadata field being more recent than a timestamp recorded in the first metadata field of the first plurality of files;

program instructions to send to the second file system, identification of the files of the first plurality of files to synchronize with the corresponding files of the second plurality of files, and initiate the second synchronization between the identified files of the first plurality of files and the corresponding files of the second plurality of files; and responsive to receiving a confirmation of the second synchronization of the identified first plurality of files with the corresponding files of the second plurality of files, program instructions to modify the remounting of the first file system to disable recording data to the first metadata field of the first plurality of files.

13. The computer program product of claim 12, wherein the first file system is configured such that the first metadata field of the first plurality of files is an access date metadata field, and is updated with a timestamp in response to synchronization of a file of the first plurality of files with a corresponding file of the second plurality of files, and the second metadata field is a modify metadata field and is updated with a timestamp when a file of the first plurality of files is modified and saved.

14. The computer program product of claim 12, wherein the first synchronization and the second synchronization are performed using a modified RSync backup utility using an access metadata field to include a timestamp of a synchronization of a file of the first plurality of files with a corresponding file of the second plurality of files.

15. The computer program product of claim 12, wherein the first metadata field and the second metadata field are selected from the group of metadata fields consisting of: mode, link and block counts, owner user ID (UID), group ID (GID), size, access date, modify date, and create/change date.

16. A computer system comprising:

one or more computer processors;

one or more computer readable storage media; and program instructions stored on the computer readable storage media for execution by at least one of the one or more processors, the program instructions comprising:

responsive to receiving a confirmation of a first synchronization of a first plurality of files of a first file system corresponding with a second plurality of files of a second file system, wherein individual files of the first plurality of files and the second plurality of files include a first metadata field and a second metadata field, program instructions to modify the mounting of the first file system to disable recording of data to the first metadata field of the first plurality of files;

responsive to receiving a second synchronization request, program instructions to remount the first file system, and enable recording of data to the first metadata field of the first plurality of files;

program instructions to identify files of the first plurality of files to synchronize with corresponding files of the second plurality of files, based on a timestamp recorded in the first metadata field being more recent than a timestamp recorded in the second metadata field of the first plurality of files;

program instructions to send to the second file system identification of the files of the first plurality of files to synchronize with the corresponding files of the second plurality of files, and initiate the second synchronization between the identified files of the first plurality of files and the corresponding files of the second plurality of files; and responsive to receiving a confirmation of the second synchronization of the identified first plurality of files with the corresponding files of the second plurality of files, program instructions to modify the remounting of the first file system to disable recording data to the first metadata field of the first plurality of files.

17. The computer system of claim 16, wherein the first file system is configured such that the first metadata field of the first plurality of files is an access date metadata field, and is updated with a timestamp in response to synchronization of a file of the first plurality of files with a corresponding file of the second plurality of files, and the second metadata field is a modify metadata field and is updated with a timestamp when a file of the first plurality of files is modified and saved.

18. The computer system of claim 16, wherein the first metadata field and the second metadata field are included in an index node (inode) of a file of the first plurality of files and the second plurality of files.

19. The computer system of claim 16, wherein the first metadata field is an access metadata field designated as st_atime and the second metadata field is a modify metadata field designated as st_mtime, the first metadata field is disabled during the first file system remount utilizing a mount -o noatime/dev/sdb2/sdb2 option command, and the first metadata field is re-enabled during the first file system remount utilizing a mount -o remount/dev/sdb2 mount -o noatime/dev/sdb2/sdb2 option.

20. The computer system of claim 16, wherein the first metadata field is added as a new metadata field to the first plurality of files and the second plurality of files.

\* \* \* \* \*